United States Patent Office 2,907,160
Patented Oct. 6, 1959

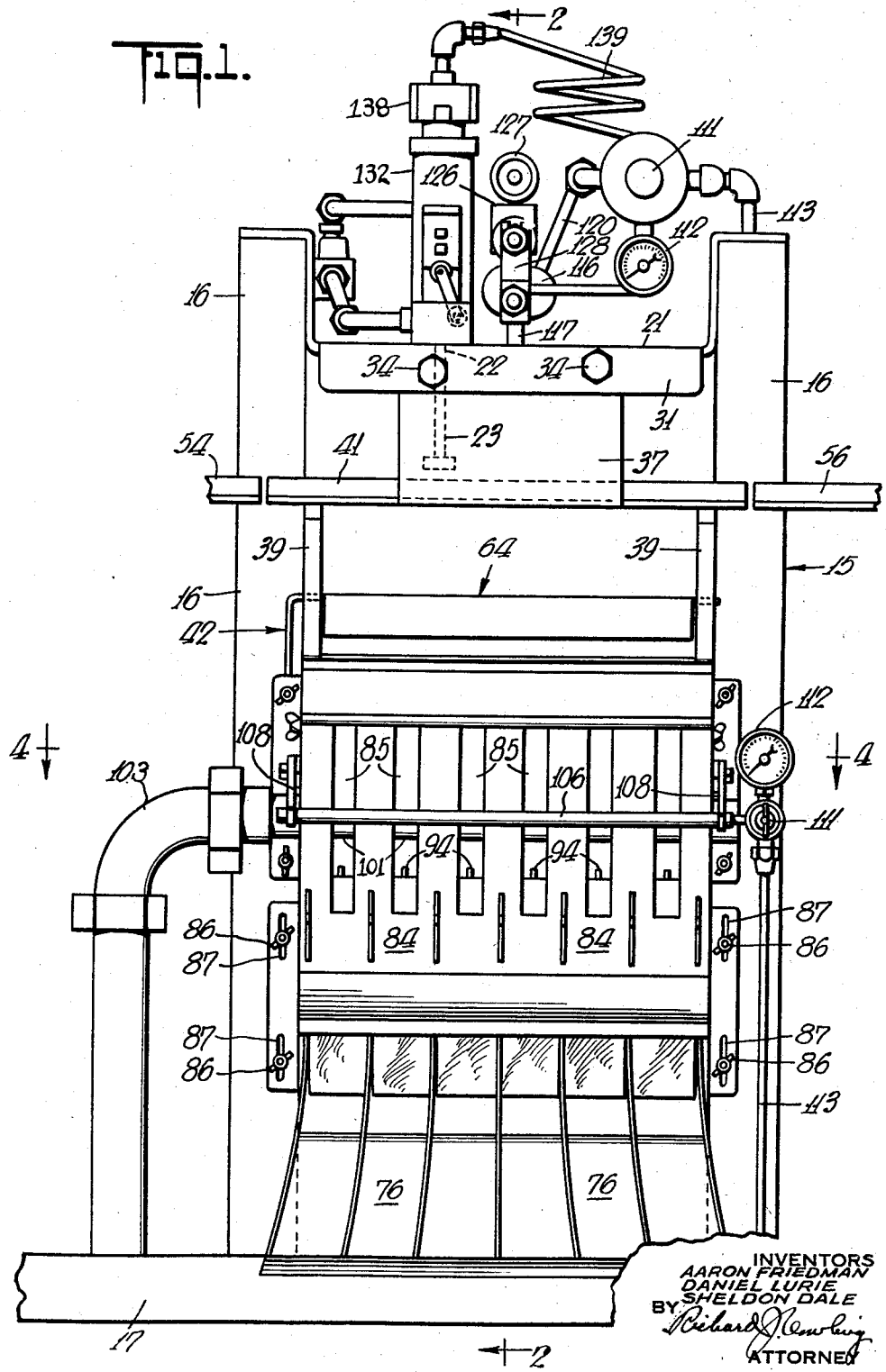

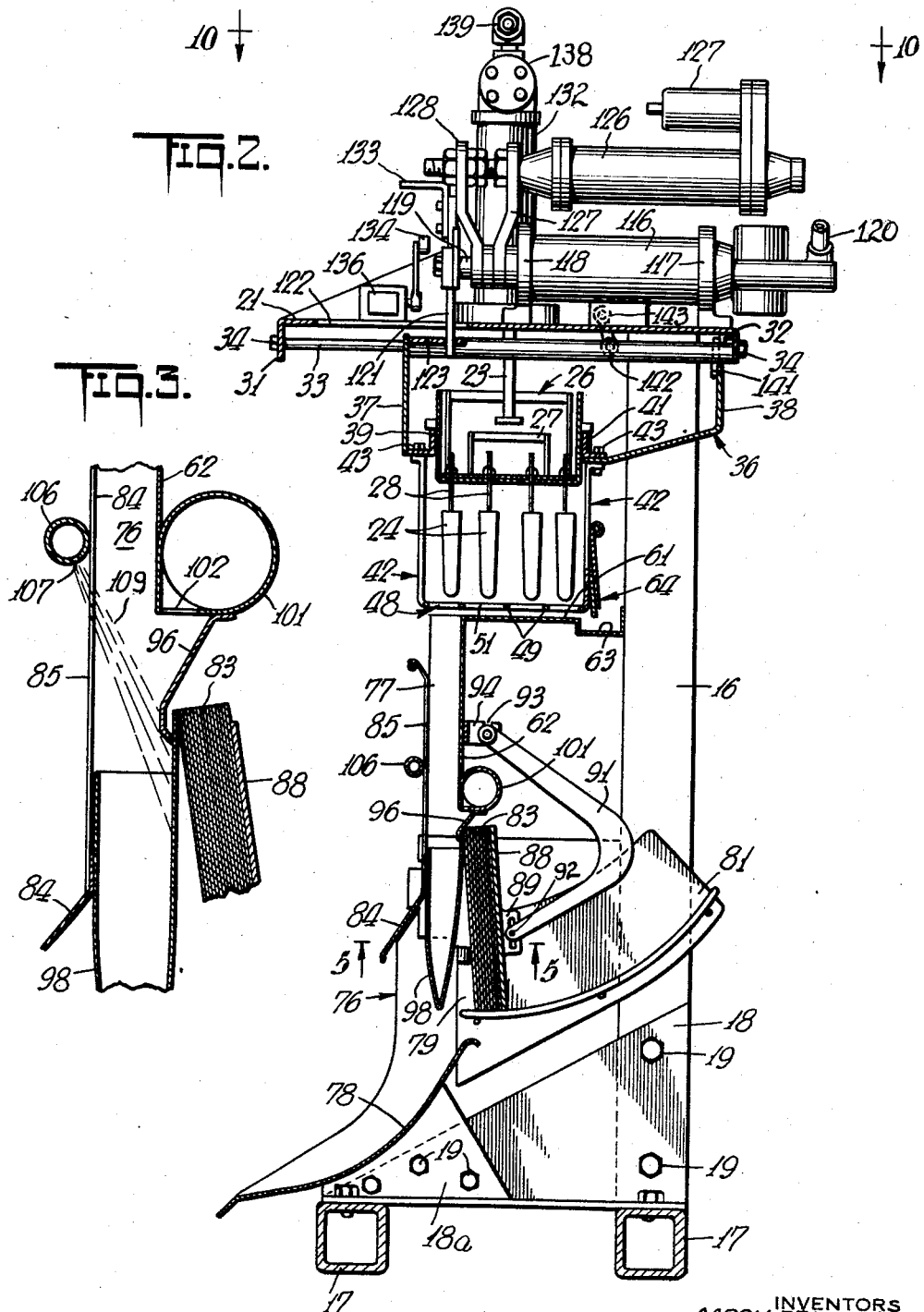

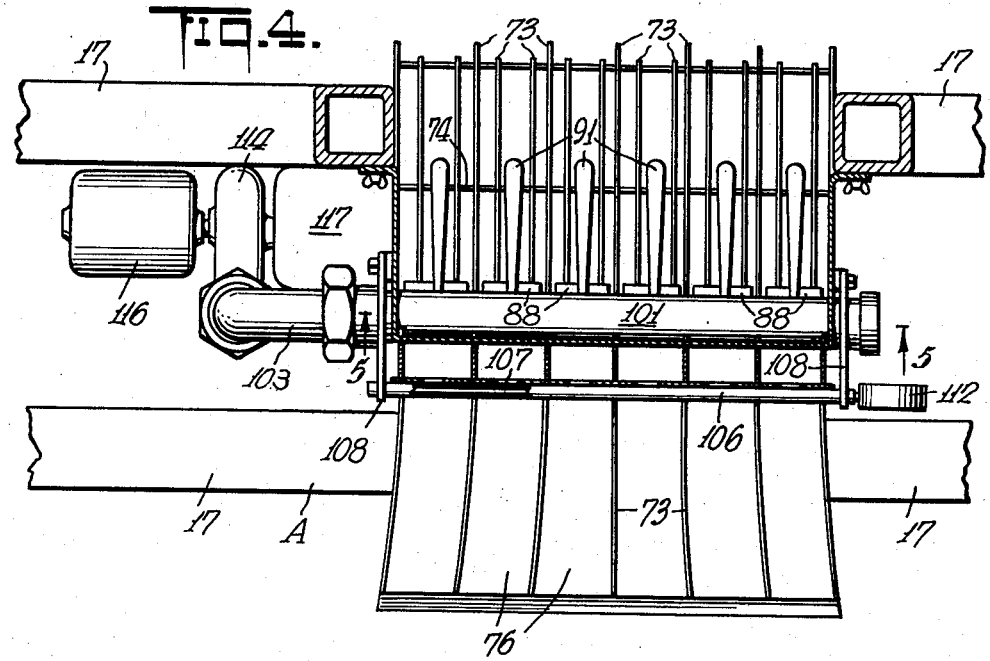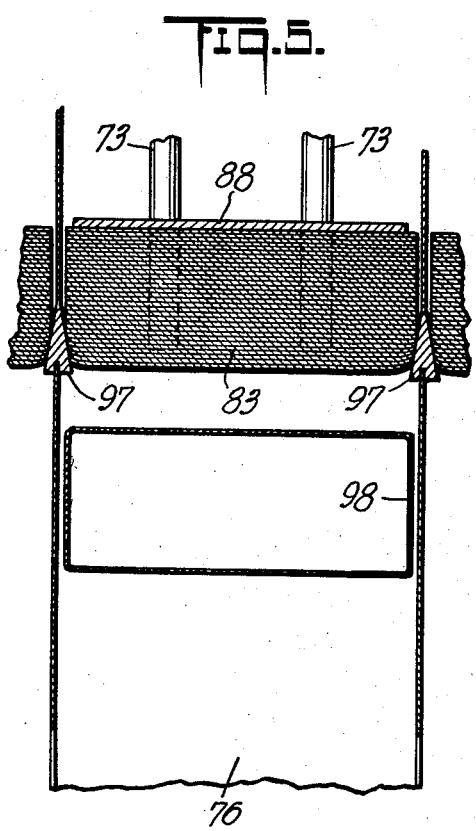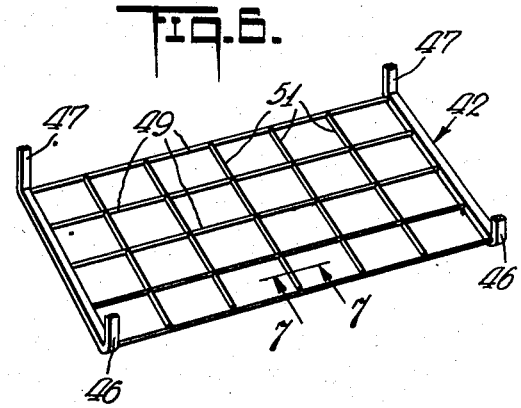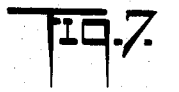

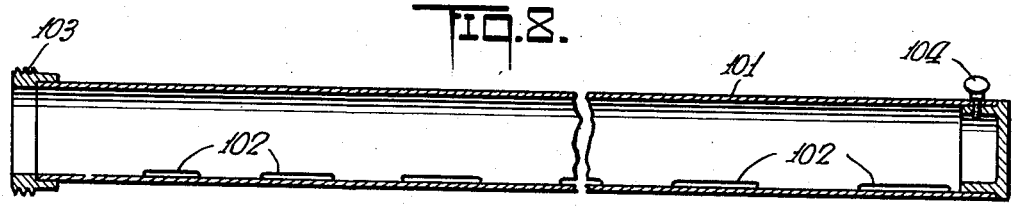
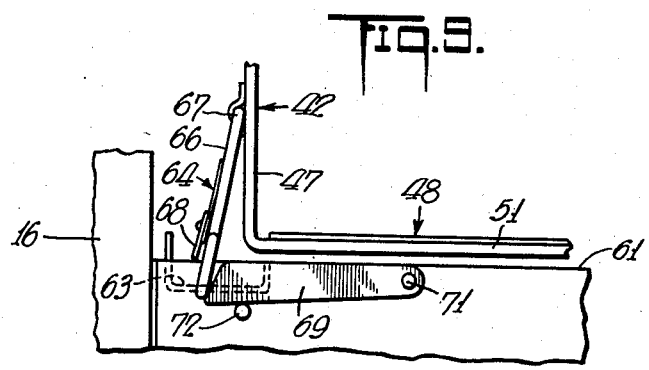
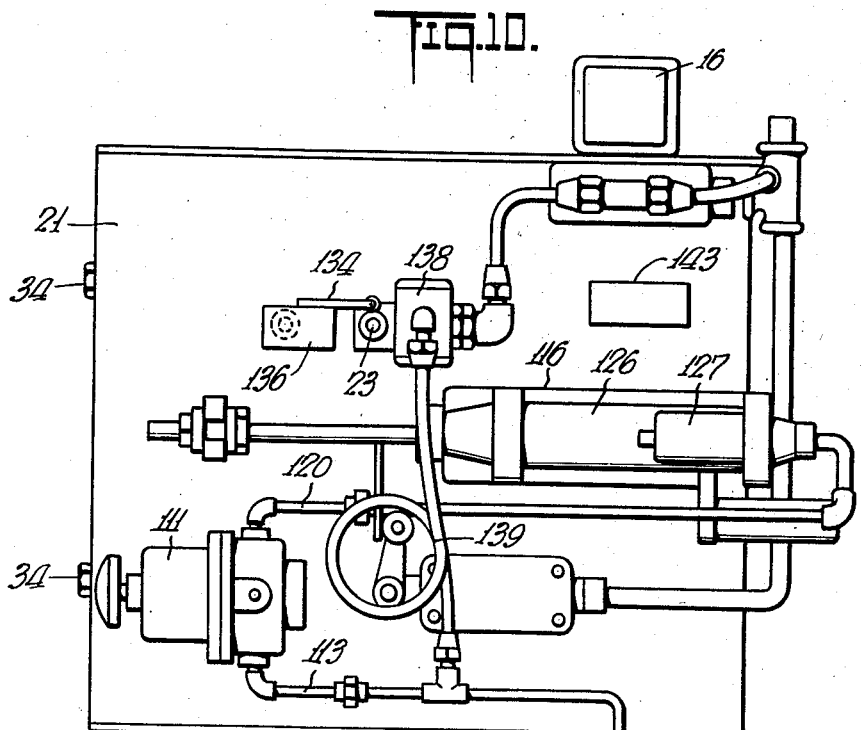

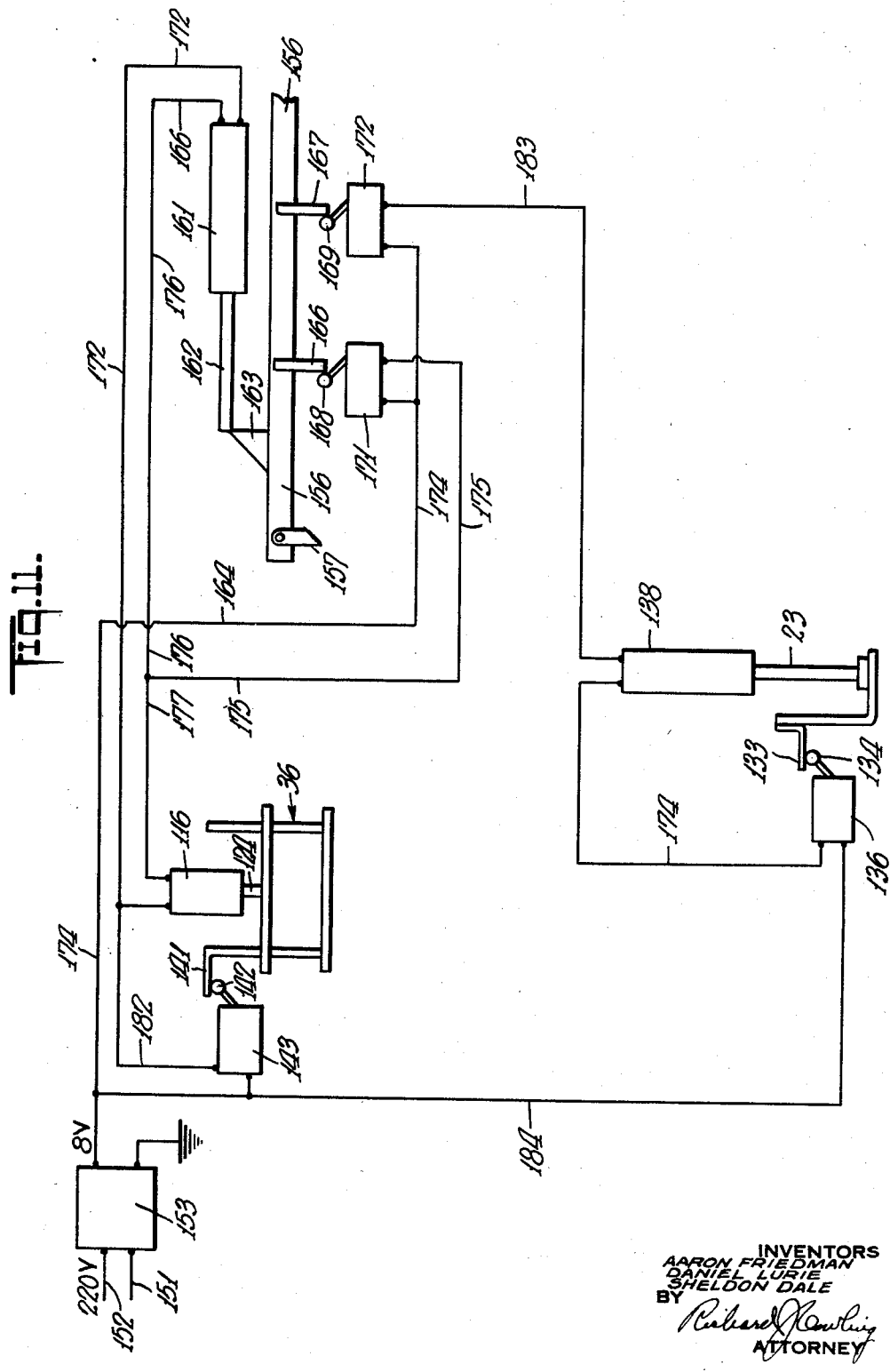

2,907,160

BAGGING MACHINE

Aaron Friedman, Daniel Lurie, and Sheldon Dale, New York, N.Y., assignors to Joe Lowe Corporation, New York, N.Y., a corporation of Delaware Application July 12, 1957, Serial No. 671,593

11 Claims. (Cl. 53—189)

The present invention relates generally to a machine for bagging automatically frozen stick confections, and it has particular relation to a machine which is capable of receiving loaded stick holders from a main, continuous and circuitous trackway, withdrawing the stickholders therefrom one at a time, releasing its confections, delivering the spaced rows of confections from the stickholder successively into chutes to be bagged, and then returning the empty stickholder to the main trackway for delivery therealong to a stick loading machine for the commencement of another cycle.

With the recent introduction of automation and exceedingly large brine tanks, it has been found essential to provide an automatic bagging machine, which will automatically receive a loaded stickholder with its depending confections, release the confections from said stickholder, deliver the released confections into chutes whereupon they may be dropped into bags or onto a conveyor for delivery to a wrapping machine, and then return the empty stickholder for delivery to a stick reloading machine.

There are a number of machines in use for automatically receiving stickholders loaded with confections, releasing said confections therefrom and delivering them to gravity chutes for automatic bagging. Most of these machines employ a magazine for receiving the released confections from the stickholder, and having the magazine deliver the released confections to the bagging chutes. Other machines receive a confection loaded stickholder, release the confections by manipulating its releasing handle and then drop the released confections onto a belt for delivery to a bagging or packaging operation.

The present invention eliminates the need for a secondary or intermediate receiving magazine for transporting the released confections from the stickholder to the gravity chutes, and utilizes the stickholder as the manipulating control means. The present invention removes a section of a continuous trackway with a loaded stickholder thereon transversely of its normal line of travel, releases and delivers the confections to gravity chutes and then returns the section of trackway with its empty stickholder to its normal position in the main continuous trackway, whereby the empty stickholder can be returned to the next operation without requiring the attendant of manual means.

An object of the present invention is to provide a simple, efficient and inexpensive machine that may be included in a circuitous trackway for handling finished confections for automatic bagging, and for manipulating the empty stickholder away from the releasing operation without requiring the attendance of an operator.

Another object of the invention is the provision of a simple, efficient and inexpensive machine having a trackway section removable from a main trackway with a loaded stickholder, whereby the confections depending therefrom may be released and delivered to the bagging chutes under control of the stickholder and the latter may be returned to the main trackway for delivery to the reloading operation.

A further object of the invention is to provide suitable means for sweeping the confection supporting platform of fragmentary pieces of material after each stickholder has been delivered of its confections, which serves to prevent any melting and sticky confection material being carried into the gravity chutes whereby they may become soiled, preventing the normal gravitation of the confections and bags therethrough.

Another object of the invention is the provision of suitable grid means for removing any web-like formations between the finished frozen confections and for manintaining their vertical alignment after release of their handle sticks from the stickholder and before they gravitate into their respective chutes to be bagged.

A further object of the invention is to provide a simple, efficient and economical method of insuring a proper opening of the bags in said chutes without distorting the same, which method includes the use of high pressure and low presure air streams to inflate properly said bags without distortion.

Other and further objects and advantages of the invention reside in the detailed construction of the machine, which result in simplicity, economy and efficiency, and which will be apparent from the following description, wherein a preferred embodiment of the invention is shown, reference being had to the accompanying drawings, forming a part hereof, wherein like numerals indicate like parts, in which:

Figure 1 is a front elevational view of a machine constructed in accordance with the principles of the invention;

Figure 2 is a sectional view of the machine shown in Figure 1, the same having been taken substantially along the line 2—2 thereof, looking in the direction of the arrows;

Figure 3 is an enlarged fragmentary cross-sectional view of the bagging features of the machine, showing the supply of bags with the foremost bag opened to receive a confection and showing the several air outlets for causing said bag to be opened fully and without distortion;

Figure 4 is a transverse elevational view, partly in section, of the bagging features of the machine, the same having been taken substantially along the line 4—4 of Figure 1, looking in the direction of the arrows;

Figure 5 is an enlarged cross-sectional view of one of the bagging chutes, showing the bag holding ribs and gravity push plate with the forward bag of the stack being shown in its open position;

Figure 6 is a perspective view of the guide frame member which serves to maintain the released confections in substantially vertical alignment after their sticks have been released from the stickholder;

Figure 7 is a cross-sectional view of one of the guide frame members, the same having been taken substantially along the line 7—7 of Figure 6;

Figure 8 is a longitudinal sectional view of the low pressure air line, showing the graduated sizes of its various openings to provide equal air pressures at all openings;

Figure 9 is an enlarged side elevational view of the scraper which sweeps any confection material from the supporting platform on its return stroke with the carriage member;

Figure 10 is a plan view of the machine shown in Figure 2, the same having been taken substantially along the line 10—10 thereof, looking in the direction of the arrows; and Figure 11 is a diagrammatic and schematic view of the wiring of the various controls for the operation of the sequential parts.

Referring now to Figure 1, there is shown a supporting frame structure 15, consisting of tubular upright members 16 and tubular cross-members 17, suitably reinforced at various points by angular plates 18 and 18-a secured by bolts 19. The plates 18 and 18-a also provide a suitable support for the bag magazines. The wiring for the electric system and the piping for the pneumatic systems are mounted within said hollow tubular frame members 16 and 17 when convenient.

The frame structure has a stationary plate 21 extending horizontally intermediate its ends, which is provided with a slot 22 to permit movement of an air hammer piston 23 that operates vertically to release the confections from their stickholder. The stickholder 26 is of a conventional construction (see Fig. 2) and has a manipulating handle 27 that locks releasably the free ends of the sticks 28 of the confections 24 when it is raised and releases said sticks when it is lowered.

The plate 21 has a front flange 31 and a back flange 32 formed integrally therewith and extending downwardly therefrom, which serve as mounting members for a pair of transversely spaced rods 33 secured fixedly therebetween by the nuts 34. The rods 33 serve as a support for a slidable carriage member 36, having a front depending channel shaped plate member 37 and a back depending U-shaped plate member 38. The lower inner edge of said front plate member 37 is upturned to provide a supporting rail 39 for one side of the stickholder 26, and the opposite inner edge of said back plate member is likewise upturned to provide a supporting rail 41 for the opposite side of the stickholder 26. A depending U-shaped frame structure 42 is mounted below said plate members 37 and 38 by means of bolts 43, and is provided with an integrally formed guide frame or grid structure 48, which is shown in greater detail in Figure 6. The horizontal guide members 49 and 51 of the grid structure 48 are of an inverted teardrop design in cross-section, and its upper knife-like edges 52 serve to cut or break any web formations that might have been formed between the confections 24 during the freezing operation due to an overfilling of the mold cavities of the conventional frozen confection mold (not shown). The depending U-shaped frame structure 42 is mounted removably to the plate members 37 and 38 by means of bolts 43 so that a similar structure of different height may be substituted for the structure 42. The height of the grid structures 42 will be dependent upon the size of the confections being made from time to time.

The supporting rails 39 and 41 of the carriage member form, when the carriage 36 is in its stickholder receiving position, a movable section of a circuitous or continuous trackway, whose connecting sections 54 and 56 are best shown in Figure 1.

Mounted immediately below the grid structure 48 is a stationary horizontal platform 61, which serves to receive and support the confections 24 by their lower ends when their handle sticks 28 have been released from the stickholder 26. It will be appreciated that, when the confections 24 are resting on the supporting platform 61, the upper ends of their handle sticks still project into the stickholder 26 while the edible portions project one each through the pockets of the grid structure or guide frame 42. Since the upper free ends of the handle sticks 28 remain within the stickholder 26, which is mounted on the supporting rails 39 and 41 of the carriage structure 36, and since the grid structure 42 is mounted fixedly on the slidable carriage structure 36, it will be appreciated that, when said carriage structure 36 is moved forwardly, the confections 24 will be carried forwardly therewith across the horizontal platform 61.

The horizontal platform 61 has a forward flange 62 depending therefrom, which serves as a part of and a supporting means for a bagging chute frame structure and its respective operating parts. The rear edge of the platform 61 has a trough 63 formed integrally therewith, which serves as a collector of any broken fragmentary pieces of confection material that may be swept off the surface of the platform 61 by the sweeping means 64 to be hereinafter more fully described.

Referring now to Figure 9, the sweeping means 64 for the supporting platform 61 consists of a frame member 66 of rectangular shape that is mounted pivotally on the rear corner supports 47 of the grid structure 48, as best shown at 67. The frame member 66 has a flexible wiping blade or squeegee 68 mounted to drag or slide across the upper surface of the supporting platform 61. The flexible squeegee 68 is mounted so that its supporting frame member 66 rides up and over a cam bar 69 mounted pivotally as at 71 to the side of the platform 61. A peg 72 mounted in the same side of the platform 61 engages the free end of the cam bar 69 and acts as a stop to limit its downward pivotal movement. When the frame member 66 moves forwardly towards the bagging chutes, it rides over the top surface of the cam bar 69, and the flexible squeegee 68 is elevated above and out of contact with the surface of the platform 61. Therefore, it cannot sweep or carry any confection pieces forwardly into the bagging chutes on its forward movement across said platform 61. However, on its return movement, the frame member 66 passes under the cam bar 69, permitting its wiping blade 68 to scrape over the surface of the platform 61 and sweep any fragmentary confection pieces backwardly until they are deposited into the trough 63. The cam bar 69, being pivotally mounted at 67, raises up to permit the frame member 66 to slide over the stop or peg 72 and between it and the bar 69.

*The bagging operation*

There is shown in Figures 1 to 5, both inclusive, the various structural details of the bagging features of the machine. Referring first to Figure 4, a series of vertical guide rods 73 are spaced transversely of the machine below the platform 61, which are connected horizontally by a series of cross bars 74 mounted on the angular plates 18 and 18-a, forming a frame structure for mounting a series of spaced chutes thereon, as indicated at 76. The chutes 76 are arranged so that one is positioned under each confection of the row of confections being pushed off the platform 61.

Each chute 76 has a vertical upper portion 77 and an arcuate lower portion 78, as best shown in Figure 2, to deliver the gravitating confections 24 downwardly and away from the machine for depositing them onto a conveyor (not shown). Each chute 76 is provided with an arcuate opening 79 in its rear wall at the junction of the vertical upper portion 77 and arcuate lower portion 78. The opening 79 is slightly larger in size than the bags required for the confections. Extending rearwardly of each of the openings 79 is a series of open-top troughs, which are of an arcuate shape and extend upwardly, forming a bag feed hopper 81. Each bag feed hopper or magazine 81 is capable of holding a relatively large quantity of empty, stacked or flattened bags 83, standing upright therein with their open ends extending upwardly. The front cover plate 84 for the chutes 76 is provided with a series of vertical slots, being one for each chute to permit inspection thereof. The plate 84 is secured removably by means of a series of wing nuts 86, which operate in vertical slots 87, permitting adjustments for bags of different sizes.

Each bag hopper or magazine 81 is equipped with a pivotally mounted metal follower or bag pushing plate 88. The plate 88 has a slotted bracket 89 mounted on its rear side, which serves to secure it pivotally to an arcuate arm 91 by the pin 92. The upper end of the arm 91 is in turn mounted pivotally in an open-top recess 93 of a supporting cross-arm 94, which is welded or otherwise permanently mounted on the rear face of the plate 62 directly over its respective chute. The weight of the push plate 88 with its pivotal arm 91 and bracket 89 gravitationally urges the bags 83 forwardly of their respective feed hoppers 81.

Referring now to Figure 5, a series of spaced stops are provided contiguous to the open end of each of the chutes 76. The upper free open end of each conventional bag has a lip construction which gives its back a greater height than its front. The higher back lip of the bag engages a stop 96 (see Fig. 2) mounted centrally above the top of each chute. Mounted on opposite sides of each chute intermediate its ends are a pair of triangular shaped stops 97, which serve to engage the side edges of the stacked bags and keep them from being pushed all the way out of the hopper and into the chutes 76.

Each chute is provided with a high pressure air jet and a low pressure air jet, which jets combine to blow open the foremost bag 98 of each chute feed hopper 81. The air pressures are so designed that, while the bag 98 is being blown open perfectly, as best shown in Figure 5, there is an insufficient force of air to blow it beyond the stops 96 and 97.

Mounted across the series of chutes 76 and just above the tops of the bags 83, as best shown in Figure 3, is a relatively large low pressure airline 101, having a series of longitudinally spaced air holes 102 therein, being one hole for each chute. It will be noted in Figure 8 that the holes 102 increase in size as they extend away from the intake end of the line 103. These differences in the sizes of the holes provide a constant air pressure at each chute of equal strength or force irrespective of the varying distances they are from the incoming air line 103 where the first hole has full air pressure strength. The air line 101 is attached fixedly to the flange 62 and is provided with a bleed valve 104 in the form of a threaded wing bolt. The pressure of the air in the low pressure air line 101 is approximately two inches of water. It is obtained from an impeller 114 driven by a conventional air motor 116. The impeller 114 receives its air from a conventional air filter 117 (see Figure 4).

It will be noted in Figure 1 that the high pressure air line 106 is mounted removably by a pair of transversely spaced brackets 108 across the front of the confection chutes 76, which chutes are formed by the front plate 84 and the depending flange plate 62. The line 106 has a series of longitudinally spaced apertures 107, being one for each chute, for discharging a stream of high pressure air 109 into its respective chute. The air stream 109, being depicted by a series of radiating dotted lines, is directed towards the back of the opened bag 98. This high pressure air, which is in the magnitude of two pounds per square inch, is required to insure a full opening of the bag all the way to its bottom so that no difficulties will be encountered when the confection gravitates thereinto. The high pressure air line is provided with an air pressure regulating valve 111, a pressure gauge 112 and a source of air supply 113 (see Figure 1).

The exact air pressures to be used in opening the bags must be determined for each machine, because, if too much pressure is used, the bags will be distorted into an elliptical shape that is not conducive to receiving a gravitating confection. If the pressures used are insufficient, it follows that the bag will be opened only partially and the gravitating confection will likely strike one or more of its edges, tearing the same and jamming the chute with a crumpled bag. The material of which the bag is made, its thickness, size and flexibility, etc. all effect the amount of air pressure required in any given situation.

The metal plate 84, forming the front face of the chutes 76, is secured removably to the frame structure for easy and ready removal for cleaning and removing crumpled bags, etc.

The operation of the slidable carriage

Referring again to Figure 2, the slidable carriage member 36 operates over the spaced rods 33 and moves from the back of the machine to the front, which is from right to left in Figure 2 of the drawings. Its movement is slow, steady and continuous by means of the operation of an air motor 116, which is suitably mounted on the stationary plate 21 by suitable collar brackets 117 and 118. The piston 119 of the motor 116 has a depending arm 121 which passes through an elongated slot 122 in the plate 21 and is attached securely to a plate 123 mounted fixedly to the upper end of the forward end of the plate 37. When the air motor 116 is actuated, its piston 119 moves forwardly from right to left, sliding the carriage 36 on its spaced supporting rods 33. The piston 119 of the air motor 116 is connected to a conventional hydro-check 126, having an oil reserve cylinder 127. The hydro-check 126 is mounted above the air motor 116 by a supporting yoke 128, which has its opposite end secured to its cylinder. The hydro-check 126 serves to give precision control to the movement of the air piston 124 of the air motor 116 in a well understood manner. The air motor 116 receives its high pressure air supply through the pipe line 120 from the pressure regulating valve 111.

At the time the carriage 36 begins its forward movement, an air hammer 137 mounted immediately above the locking handle 27 of the stickholder 26 has a piston 23 that begins to descend, striking said handle 27 with sufficient force to move it downwardly to release the handle sticks 28 from the stickholder 26. The air hammer piston 23 has a stop 133 mounted thereon which is carried downwardly to engage a roller arm 134 of an electrical limit switch 136. When the stop 133 engages the limit switch arm 134, it causes the air hammer piston 23 to be returned to its normal resting position above the stickholder for its next operating cycle. The air hammer piston 23 is operated by an air motor 138 connected by the air line 139 to the incoming air supply line 113.

The slidable carriage 36 has a fixed depending stop 141, which moves into engagement with a pivotal roller arm 142 of a limit switch 143. When the stop 141 engages the roller arm 142, the limit switch is actuated to cause the carriage 36 to be returned to its normal position with its stickholder track section 41 back into alignment with the main trackway sections 54 and 56.

Referring now to Figure 11, there is shown diagrammatically and schematically an electrical circuit for the several conventional snap-action precision limit switches and the means for delivering the confection loaded stickholders 26 onto the movable section 41 of the circuitous trackway.

It will be assumed in the following description that the control circuits are all energized to the various limit switches, which are normally open unless otherwise specified. The source of electrical energy is a 220 volt circuit received through the wires 151 and 152, which then pass through a conventional step-down transformer 153 where the voltage is reduced to an 8 volt circuit for safe operation.

The confection loaded stickholders 26 are received from a refrigerating tunnel (not shown). They may be moved through said tunnel in any suitable manner, but a preferred form is a pair of spaced reciprocating pusher rods or bars, one of which is shown diagrammatically at 156. These bars 156 have a series of longitudinally spaced depending pawls 157 for engaging the stickholders 26 on opposite sides of their back end. The pawls 157 are mounted to pivot from right to left to permit them to pass over said stickholders 26 on their return movement but to pick up the next succeeding stickholder in line by its rear end on its next forward movement. The pawls 157 are so spaced on the pusher bars 156 that the last pawl will have moved at the end of its forward stroke its stickholder 26 centrally of the movable trackway section 41, which is actually a part of the slidable carriage 36 of the machine 15.

The pusher bars 156 are reciprocated by means of an air motor 161, having a piston 162 moving horizontally and in parallel relation to the movement of the pusher bars 156. The piston 162 is connected fixedly by plates 163 to the pusher bars 156 so that they must move in unison as a unit with said piston.

One of the pusher bars 156 has a pair of spaced stops 166 and 167 depending therefrom, which are adapted to engage pivotal roller arms 168 and 169 of a pair of conventional snap-acting limit switches 171 and 172, respectively. The switches 171 and 172 are energized and connected in parallel by the wire 174 leading to the transformer 153.

When the stop 166 engages the roller arm 168, it closes the switch 171, thereby energizing the wire 175, sending current to the wire 176, which is connected to the return side of the air motor 161, causing it to withdraw its piston 162 to a position for picking up the next succeeding stickholder in the refrigerating tunnel. When the wire 175 is energized, current is also delivered by the wire 177 to the air motor 116, causing it to be operated and forcing its piston 124 forwardly, which moves the slidable carriage member 36 forwardly on the rods 33. This forward movement continues slowly and evenly until the last row of confections 24 in the stickholder 26 is deposited in the chutes 77. When the last row of confections 24 has been dropped in the bagging chutes 77, the stop 141 has engaged the roller arm 142 of the limit switch 143, which energizes the wire 182 leading to the return side of the air motor 161, causing its piston 162 to be reactivated and with it the pusher bars 156 on the next succeeding cycle.

At approximately the same time that the stop 166 engages the roller arm 168 of the limit switch 172, a second stop 167 engages its roller arm 169 of the limit switch 172, thereby energizing the circuit through the wire 183 to the air cylinder 138 of the air hammer position 23, causing it to descend and strike the upright locking handle 27 of the stickholder 26, driving it downwardly to release the handle sticks 28 therefrom. The piston of the air hammer 23 has a stop 133 adapted to engage the roller arm 134 of the electric limit switch 136, causing it to energize the circuit formed by the wire 184, which causes the return of the air hammer 23 to its normal upward position.

Although we have shown and described in detail only one form which our invention may assume, it will be apparent to those skilled in the art that the same is not to be so limited, but that various other modifications may be made therein without departing from the spirit thereof or from the scope of the appended claims.

What we claim is:

1. In an automatic bagging machine of the type that receives a stickholder having a plurality of depending confections releasably secured therein, said stickholder having a manipulating handle to secure and release its confections, having a continuous main trackway passing therethrough, a section of said trackway being movable laterally therefrom with a stickholder and its depending confections locked therein, a platform below said trackway for supporting released confections whose handle sticks remain within the locking means of said stickholder, means intermediate said trackway and platform for maintaining said confections in substantially vertical alignment on said platform, means including an air hammer actuated by movement of said stickhloder on said trackway to release said confections from said stickholder, and means actuated by movement of said stickholder on said trackway to move continuously said trackway section across said platform whereby each row of released confections is successively moved off said platform into depending gravity chutes for bagging.

2. In an automatic bagging machine of the type that receives a stickholder having a plurality of depending confections releasably secured therein, said stickholder having a manipulating handle to lock and release its confections, said machine having a continuous trackway passing therethrough, a section of said trackway being mounted on a carriage movable laterally therefrom with a stickholder and its depending confections positioned thereon, a stationary platform below said trackway carriage section for supporting the released confections whose handle sticks remain within said stickholder, means intermediate said carriage trackway section and said platform for maintaining said confections in substantially vertical alignment on said platform, means including an air hammer actuated by movement of said stickholder on said trackway to release said confections from said stickholder, means actuated by movement of said stickholder on said trackway to move continuously said carriage trackway section across said platform whereby each row of released confections is successively moved off said platform into depending gravity chutes for bagging, and means carried by said air hammer to reverse its movement when said confections are released.

3. In an automatic bagging machine of the type that has a trackway extending therethrough with a transversely movable section capable of holding a stickholder with a plurality of pendant confections locked therein by their handle sticks, said stickholder having a manipulating handle for locking and releasing said handle sticks, guide means positioned below said confections suspended from said trackway for maintaining their vertical alignment after release from said stickholder, a platform immediatley below said guide means for supporting said confections after their release from said stickholder and while their handle sticks remain within the same, means actuated by said stickholder moving means for manipulating its handle to release said confections, a second means actuated by said stickholder moving means for transversely moving said stickholder across said platform to drop its pendant confections into gravity chutes, and means actuated by said stickholder transverse moving means for returning said stickholder and trackway to its normal position.

4. In an automatic bagging machine of the type that has a trackway extending therethrough with a transversely movable section capable of holding a stickholder with a plurality of pendant confections locked therein by their handle sticks, said stickholder having a manipulating handle for securing and releasing said handle sticks, guide means positioned below said confections suspended from said trackway for maintaining their vertical alignment after release from said stickholder, a platform immediately below said guide means for supporting said confections after their release from said stickholder and while their handle sticks remain within the same, means actuated by said stickholder moving means for manipulating its handle to released said confections, a second means actuated by said stickholder moving means for transversely moving said stickholder across said platform to drop its pendant confections into gravity chutes, means actuated by said stickholder transverse moving means for returning said stickholder and trackway to its normal position, and means carried by said transversely moving means for scraping said platform to remove any fragmentary confection material therefrom.

5. In an automatic bagging machine of the type that has a trackway extending therethrough, a transversely movable section of said trackway capable of holding a stickholder with a plurality of pendant confections locked therein by their handle sticks, said stickholder having a manipulating handle for securing and releasing said handle sticks, guide means positioned below said confections suspended from said movable trackway for maintaining their vertical alignment after release from said stickholder, a stationary platform immediately below said guide means for supporting said confections after their release from said stickholder and while their handle sticks remain within the same, means actuated by said stickholder moving means for manipulating its handle to release said confections, a second means actuated by said stickholder moving means for transversely moving said stickholder across said platform to drop its pendant confections into gravity chutes, means actuated by said stickholder transverse moving means for returning said stickholder and trackway to its normal position, and means carried by said transversely moving means for scraping said platform on its return to remove any fragmentary confection material therefrom.

6. In an automatic bagging machine of the type that has a continuous trackway extending therethrough for receiving and removing stickholders therefrom, a section of said trackway being mounted on a transversely movable carriage, said carriage having a guide frame spaced below said trackway, said guide frame having a plurality of openings therethrough spaced according to the confections depending from said stickholder, a stationary platform mounted below said guide frame upon which the confections are supported when released from their stickholder, said platform being spaced from said trackway a distance whereby the handle sticks remain within said stickholder after their release, means actuated by said stickholder feeding means for releasing said confections from said stickholder, means actuated by said stickholder feeding means for moving said carriage across said platform, a series of gravity chutes extending along the forward edge of said platform spaced according to the spacing of the confections longitudinally of said stickholder whereby the confections as they move off said platform drop one into each chute, and means actuated by said carriage for causing the same to return to its position on said continuous trackway when the last row of confections has been deposited in said chutes.

7. In an automatic bagging machine of the type that has a continuous trackway extending therethrough, means for moving said stickholders along said continuous trackway, a section of said trackway being mounted on a transversely movable carriage, said carriage having a guide frame spaced below said trackway, said guide frame having a plurality of openings therethrough spaced according to the spacing of the confections depending from said stickholder, a stationary platform mounted below said guide frame upon which the confections are supported when released from their stickholder, said platform being spaced from said trackway a distance whereby the handle sticks remain within said stickholder after their release, means actuated by said stickholder feeding means for releasing said confections from said stickholder, means actuated by said stickholder feeding means for moving said carriage across said platform, a series of gravity chutes extending along the forward edge of said platform spaced according to the spacing of the confections in said stickholder whereby said confections as they move off said platform drop one into each chute, means actuated by said carriage for causing the same to return to its position on said continuous trackway when the last row of confections has been deposited in said chutes, and means mounted on said carriage for wiping said stationary platform on its return movement to said trackway.

8. In an automatic bagging machine of the type that has a main trackway extending therethrough for delivering stickholders thereto and removing them therefrom, a section of said trackway being mounted on a movable carriage adapted to be moved transversely for depositing the suspended confections in said stickholder into bagging chutes, said stickholder having a handle for releasing the handle sticks of said confections, guide means carried by said carriage and positioned adjacent the ends of said suspended confections for maintaining their vertical alignment after their release from said stickholder, a stationary confection supporting platform mounted below said guide means for receiving said confections when released from said stickholder, means actuated by said stickholder delivery means for releasing said confections from said stickholder, a second means actuated by said stickholder delivery means for moving said carriage transversely across said platform whereby each row of confections is moved successively off said platform into chutes adjacent the forward edge thereof for bagging, means actuated by said carriage after its last row of confections is deposited in said chutes to return the same whereby its trackway again becomes a part of said main trackway, and means carried by said carriage to sweep the surface of said platform of confection material.

9. In an automatic bagging machine of the type that has a longitudinal trackway extending therethrough for delivering stickholders thereto and removing them therefrom, a section of said trackway being mounted on a movable carriage adapted to be moved transversely for depositing the confections of said stickholder into bagging chutes, said stickholder having a handle for locking and releasing the handle sticks of said confections, guide means carried by said carriage and positioned below the ends of said pendant confections for maintaining their vertical alignment after their release from said stickholder, a confection supporting platform below said guide means for receiving said confections when released from the stickholder, means actuated by said stickholder feeding means for releasing said confections from said stickholder, a second means actuated by said stickholder feeding means for moving said carriage transversely across said plateform whereby each row of confections is dropped successively into chutes adjacent the forward edge of said platform for bagging, means actuated by said carriage after its last row of confections is deposited in said chutes to return the same whereby its trackway becomes a part of said longitudinal trackway.

10. In an automatic bagging machine having a plurality of spaced gravitational delivery chutes, means intermediate the back of each of said chutes for holding a quantity of empty stacked bags in substantial alignment, means for forcing said bags forwardly whereby the front bag of each chute is contiguous therewith, and spaced means including a separate high pressure air jet and a separate low pressure air jet for opening said foremost bag and causing its front and sides to bellow out against the sides of said chute to facilitate the dropping of a confection therein, said high pressure air jets being mounted in spaced relation one each in front of said chutes and said low pressure air jets being mounted one each above said magazines.

11. In an automatic bagging machine having a plurality of spaced gravitational delivery chutes, magazines intermediate the back of each of said chutes for holding a quantity of empty stacked bags in substantial alignment, means for forcing said bags forwardly of said magazines whereby the front bag of each chute is contiguous therewith, means including a high pressure air jet mounted in front of each of said chutes, means including a low pressure air jet mounted behind each of said chutes for blowing open said foremost bag of each chute and causing its front and sides to bellow out against the sides of said chute to facilitate the dropping of confections therein, and separate means included in said high and low pressure air systems for regulating the air pressures therein.

References Cited in the file of this patent

UNITED STATES PATENTS

| | | |
|---|---|---|
| 1,600,320 | Danquigney | Sept. 21, 1926 |
| 2,629,369 | Nelson | Feb. 24, 1953 |
| 2,721,015 | Caneles | Oct. 18, 1955 |